Figure 1:
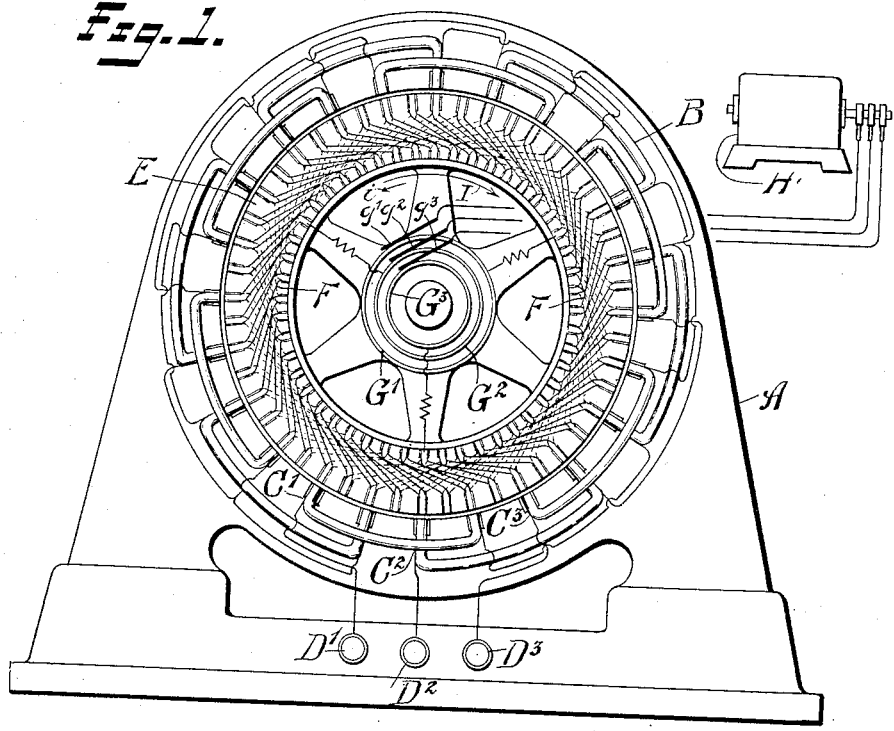

No. 859,143. PATENTED JULY 2, 1907.
W. STANLEY.
METHOD OF GENERATING AND DISTRIBUTING ELECTRICAL ENERGY.
APPLICATION FILED JAN. 20, 1904. RENEWED APR. 26, 1907.

Witnesses
Geo. V. Rasmussen

Inventor
WILLIAM STANLEY
By his Attorney

UNITED STATES PATENT OFFICE.

WILLIAM STANLEY, OF GREAT BARRINGTON, MASSACHUSETTS.

METHOD OF GENERATING AND DISTRIBUTING ELECTRICAL ENERGY.

No. 859,143.  Specification of Letters Patent.  Patented July 2, 1907.

Original application filed October 27, 1903, Serial No. 178,772. Divided and this application filed January 20, 1904. Renewed April 26, 1907. Serial No. 370,376.

*To all whom it may concern:*

Be it known that I, WILLIAM STANLEY, a citizen of the United States, residing at Great Barrington, in the county of Berkshire, State of Massachusetts, have invented certain new and useful Improvements in Methods of Generating and Distributing Electrical Energy, of which the following is a full, clear, and exact description.

My invention relates to systems for generating and distributing electrical energy and has for its object to provide new and improved method by which variations in load shall be automatically compensated for.

My invention is an improvement over the method described in Letters Patent Nos. 712,613 and 712,614 granted to myself and John F. Kelly on November 4th. 1902. In the method and apparatus described in the above mentioned patents, the magnetic field which acts to induce currents in the armature circuit is caused to move relatively to those armature circuits, partly by mechanical movement and partly by reason of the fact that it has a movement of rotation relatively to the field magnet itself due to the fact that it is produced by alternating currents of different phase. In the apparatus described in said Letters Patent Nos. 712,613 and 712,614 the movement of the field structure relatively to the armature structure is in the same direction as the movement of rotation of the magnetic field produced by the multiphase currents so that the effective movement is equal to the sum of the two movements.

I have discovered that there are decided advantages to be gained by causing the field structure to have a movement relatively to the armature structure which shall be in the opposite direction to the rotating field produced by the exciting multiphase currents so that the effective field shall have a movement equal to the difference between these two movements, the field conductors and the magnetic field being thus made to slowly cut through each other from front to rear. Thus, for instance, suppose it is desired to supply to the mains currents having a periodicity of 60 alternations per second; I excite the field structure by currents of relatively low periodicity,—say, 3 alternations per second,—and set up an inducing field having a corresponding rate of revolution. I then revolve the field structure itself by mechanical power in the opposite direction to the direction of rotation of the rotating field impressed by these low periodicity currents and at the rate of corresponding to 63 alternations per second. Inasmuch as the impressed field is revolving in one direction at the rate of 3 alternations per second and the field structure upon which it is impressed is revolving in the opposite direction at the rate of corresponding to 63 alternations per second, the rate of rotation of the magnetic field relatively to any point upon the armature will correspond to 60 alternations per second; *i. e.*, will correspond to the desired frequency and will produce electromotive forces of that frequency in the armature conductors.

It is to be noted that the windings of the field magnet structure are revolving relatively to the armature structure at a faster rate than the effective magnetic field which acts upon the armature windings. This results in causing the field conductors to overtake and slowly cut through the field produced by the armature reaction, inducing in said field conductors electromotive forces whose phase is displaced by 180° from what they would be if the field structure revolved in the same direction as the field impressed upon it and therefore being such as to coact more advantageously with the original electromotive forces in the exciter circuits in overcoming the resistances and inductances of the exciter circuits. An increase in the positive lag of the armature current so changes the phase of these induced electromotive forces as to still further assist the original exciter electromotive forces.

The increase in the amount of armature current induces in the field conductors greater electromotive forces which co-act with the original exciter electromotive forces, producing similar results in overcoming the resistances and inductances in the exciter circuits. The reaction of the armature windings and currents induced therein upon the windings of the field magnet structure is such that when the load upon the mains is increased the field magnet structure becomes more highly magnetized and causes the generator to supply a higher electromotive force to the mains; or, in other words, to compensate for variations in drop due to variations in the load. When the current lags the reaction is such as to maintain the field magnetism and thus maintain the electromotive forces at the machine terminals. In both cases the result is attained through inducing electromotive forces in the exciting circuits by the armature field. In case of increase in load the value of the induced electromotive forces is increased, and in the case of increase in lag their phase relation is varied, the result in each case being to assist the original electromotive force in overcoming the resistances and inductances of the exciter circuits. The machine will, therefore, compensate for variations in both the character and amount of load. The generator and exciter should be constructed as described in the former patents referred to, the stator and rotor circuits having high mutual induction and the relation of the resistances to the inductances of the energizing circuits being determined by the "characteristics" required of each machine. As stated in the patents referred to the inductances always are high relatively to the resistances so as to make the counter-electromotive forces of the exciter circuits always substantially equal to the applied electromotive forces.

Figure 2:
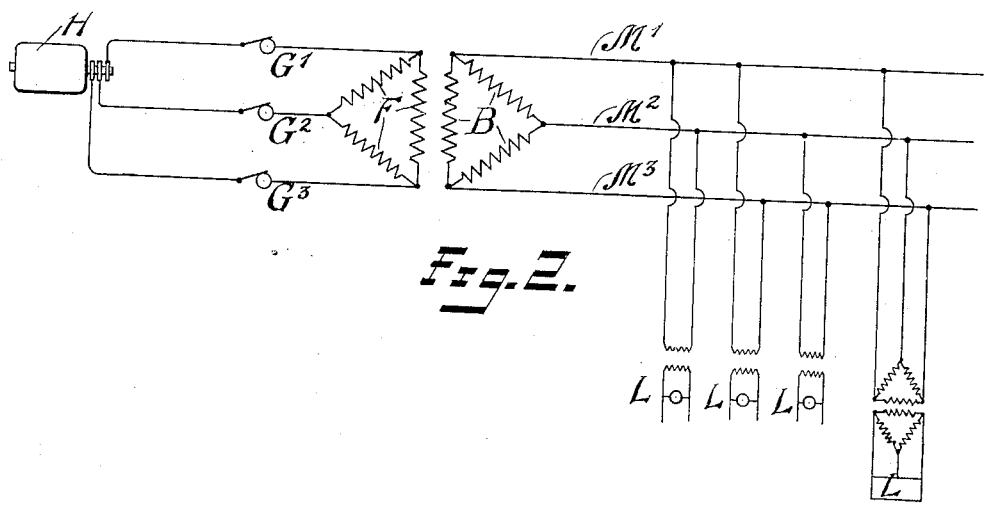

The following is a description of a system embodying my invention, reference being had to the accompanying drawings in which Figure 1 is a side elevation of a generator embodying my invention, and Fig. 2 is a diagrammatic view of the same.

Referring more particularly to the drawings A represents the armature structure of an alternating current generator having induced windings B of the distributed type and connected at three points $C'$ $C^2$ $C^3$ with binding-posts $D'$ $D^2$ $D^3$ which are connected to the mains $M'$ $M^2$ $M^3$.

E is a field structure having the distributed windings F with collecting rings $G'$ $G^2$ $G^3$ connected to the same at three equidistant points. Upon the collecting rings $G'$ $G^2$ $G^3$ bear three brushes $g'$ $g^2$ $g^3$ which are connected to conductors leading from the low frequency three-phase exciter H.

L L L are lamps or other translating devices supplied by the mains $M'$ $M^2$ $M^3$. The field windings F have high inductance relatively to their resistance, so as to have their applied and counter-electromotive forces always substantially equal, and have high mutual induction relatively to the armature windings B.

Without intending to define exact limits, I would say that I have found in practice that good results can be obtained when the very low frequency of the exciting currents is as low as 10% of the normal frequency of the machine and from that down to $2\frac{1}{2}$% according to the characteristics required.

In operating the apparatus the exciter is operated to impress upon the field magnet structure a rotating magnetic field which moves relatively to that structure,— say in the direction of the arrow $i$ corresponding to three alternations per second. The field structure itself is given a movement of physical rotation in the opposite direction corresponding to 63 alternations as indicated by the arrow I, thereby causing the magnetic field to rotate relatively to the armature structure at a rate corresponding to the difference between the rates of speed indicated by the two arrows, resulting as stated in the variations of the electromotive force supplied by the machine to compensate for variations in load. Thus, if the load increases the electromotive forces supplied by the machine will rise accordingly, on account of increased magnetism due to increased current, while if the current lags the electromotive forces will be maintained, the tendency to demagnetize being counteracted by increased energizing power due to the change of phase of the electromotive forces induced in the field conductors by the armature reaction. The advantages of a method and structure which will operate to produce such results without any external appliances are obvious.

It is, of course, obvious that it is not necessary that the field structure should rotate physically but that if the field structure is stationary and has impressed upon it the rotating field due to the low frequency currents and the armature is caused to revolve in the same direction as the rotation of the field impressed on the field structure, so as to make the rotation of the field structure relatively thereto in the opposite direction from the rotation of the impressed field, the same result will be accomplished. In other words, the armature being stationary, the field structure itself may be caused to rotate in the opposite direction to the rotating field impressed upon it, or the armature structure may be caused to rotate in the same direction as the magnetic field impressed upon a stationary field structure. In either case, the effective relative movement between the magnetic field and the armature will be the difference between the rate of rotation of the impressed field and that of the physically moving part and the field conductors and the field set up by the exciting currents will slowly cut through each other from front to rear.

My invention permits of being carried out by various embodiments of which I have shown but one. The changes and modifications will be obvious to those skilled in the art.

This application is a division of my application Serial No. 178,772 filed October 27, 1903.

What I claim is:

1. The method of generating alternating currents which consists in impressing upon a field producing structure a revolving field of very low frequency as compared with the frequency of the currents generated, causing said field producing structure to move relatively to the armature circuit in a direction opposite to that of the revolving field, thereby impressing upon the armature circuit a revolving field having a frequency equal to the frequency due to mechanical rotation less the frequency of the magnetizing currents and by such revolving field inducing currents in the armature circuits, said armature currents reacting upon the circuits of the field structure.

2. The method of generating electric currents which consists in impressing upon the field producing structure of a machine a revolving field of low frequency as compared with the frequency of the currents to be generated, causing the field structure to rotate relatively to the armature structure in a direction opposite to that of the rotating field impressed upon it, thereby causing the energizing conductors and said field to slowly cut through each other from front to rear, inducing in the armature circuits by the resultant relatively rotating field electric currents, said induced electric currents reacting upon the energizing circuits of the field structure so as to vary the field magnetism in accordance with variations in the load connected to the mains.

3. The method of generating and distributing electrical energy by alternating currents which consists in supplying to multiphase exciting circuits low frequency alternating currents of different phase, maintaining in said circuits counter-electromotive forces substantially equal to the applied electromotive forces under all normal conditions of load, setting up by said currents a field rotating slowly relatively to the field structure and causing said field structure to move relatively to induced armature circuits in the opposite direction to the movement of said field so as to cause the exciting circuits and said field to slowly cut each other from front to rear.

4. The method of producing alternating currents of normal frequency and constant electromotive forces, which consists in supplying to the terminals of multiphase exciting circuits multiphase alternating electromotive forces of low frequency, maintaining in said circuits counter-electromotive forces substantially equal to the applied electromotive forces under all normal conditions of load and creating by the currents thus produced a rotating magnetic field, inducing currents of normal frequency by this field together with the aid of relative mechanical motion between the field and armature structures, said motion being such as to cause the exciting circuits and said field to cut each other from front to rear, thus controlling the flow of the currents due to the low frequency electromotive forces by the reaction of the induced currents.

5. The method of generating alternating currents in an alternating current system which consists in exciting the field of the generator by low frequency polyphase alternating currents setting up thereby a rotating magnetic field, inducing alternating currents of normal frequency by the field thus produced and by relative mechanical rotation of the field structure and armature such as to cause the said field to slowly cut the exciting circuits from front to rear and cause the low frequency currents to react upon the exciting circuits.

6. The method of generating alternating currents in an alternating-current system which consists in exciting the field of the generator by low frequency polyphase alternating currents, inducing alternating currents of normal frequency by the field thus produced and by relative mechanical rotation of the field and armature such as to cause the field circuits and said field to cut each other from front to rear, and maintaining the applied and counter-electromotive forces in the field circuits substantially equal under all normal conditions.

7. The method of generating electrical energy by alternating currents which consists in supplying to the multiphase exciter circuits substantially constant potential low frequency alternating currents of differing phase maintaining in said circuits counter-electromotive forces substantially equal to the applied under all normal conditions of load and causing said field to induce alternating currents of normal frequency in armature circuits revolving relatively to the field structure so as to make said energizing circuits and said field to slowly cut through each other from front to rear.

8. The method of producing alternating currents of normal frequency and constant electromotive force, which consists in supplying to the exciting circuits substantially constant potential alternating electromotive forces of low frequency maintaining in said circuits counter-electromotive forces substantially equal to the applied electromotive forces under all normal conditions of load and creating from the currents thus produced a rotating magnetic field inducing alternating currents of normal frequency by said field together with the aid of mechanical motion such as to make said field cut the exciting circuits from front to rear and controlling the flow of current due to the low frequency electromotive forces by the reaction of the induced currents upon said field.

Signed at Great Barrington, Massachusetts, this 19th day of January, 1904.

WILLIAM STANLEY.

Witnesses:
 EDWIN SEGER,
 WILLIAM F. BISSING.